(12) United States Patent
Brunk et al.

(10) Patent No.: US 8,077,911 B2
(45) Date of Patent: Dec. 13, 2011

(54) METHODS, APPARATUS AND PROGRAMS FOR GENERATING AND UTILIZING CONTENT SIGNATURES

(75) Inventors: Hugh L. Brunk, Portland, OR (US); Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 405 days.

(21) Appl. No.: 12/331,227

(22) Filed: Dec. 9, 2008

(65) Prior Publication Data

US 2009/0089586 A1    Apr. 2, 2009

Related U.S. Application Data

(63) Continuation of application No. 11/613,876, filed on Dec. 20, 2006, which is a continuation of application No. 10/027,783, filed on Dec. 19, 2001, now Pat. No. 7,289,643.

(60) Provisional application No. 60/257,822, filed on Dec. 21, 2000, provisional application No. 60/263,490, filed on Jan. 22, 2001.

(51) Int. Cl.
    *G06K 9/00* (2006.01)
(52) U.S. Cl. .................... 382/100; 382/305; 382/307
(58) Field of Classification Search .................. 382/100, 382/305, 307
    See application file for complete search history.

(56) References Cited

U.S. PATENT DOCUMENTS

| | | | |
|---|---|---|---|
| 3,810,156 A | 5/1974 | Goldman | |
| 3,919,479 A | 11/1975 | Moon et al. | |
| 4,071,698 A | 1/1978 | Barger, Jr. et al. | |
| 4,230,990 A | 10/1980 | Lert, Jr. et al. | |
| 4,284,846 A | 8/1981 | Marley | |
| 4,432,096 A | 2/1984 | Bunge | |
| 4,450,531 A | 5/1984 | Kenyon et al. | |
| 4,495,526 A | 1/1985 | Baranoff-Rossine | |
| 4,499,601 A | 2/1985 | Matthews | |
| 4,511,917 A | 4/1985 | Kohler et al. | |
| 4,547,804 A | 10/1985 | Greenberg | |
| 4,677,466 A | 6/1987 | Lert, Jr. et al. | |
| 4,682,370 A | 7/1987 | Matthews | |
| 4,697,209 A | 9/1987 | Kiewit et al. | |
| 4,776,017 A | 10/1988 | Fujimoto | |
| 4,843,562 A | 6/1989 | Kenyon et al. | |
| 4,972,471 A | 11/1990 | Gross | |
| 4,994,831 A | 2/1991 | Marandi | |
| 5,019,899 A | 5/1991 | Boles et al. | |
| 5,276,629 A | 1/1994 | Reynolds | |

(Continued)

FOREIGN PATENT DOCUMENTS

EP           0 161 512       11/1985

(Continued)

OTHER PUBLICATIONS

U.S. Appl. No. 09/337,590, filed Jun. 21, 1999, Geoffrey B. Rhoads.

(Continued)

*Primary Examiner* — Wesley Tucker

(57) ABSTRACT

The presently claimed invention generally relates to deriving and/or utilizing content signatures (e.g., so-called "fingerprints"). One claim recites a method of generating a fingerprint associated with a content item including: pseudo-randomly selecting a segment of the content item; and utilizing a processor or electronic processing circuitry, fingerprinting the selected segment of content item as at least an identifier of the content item. Of course, other claims and combination are provided as well.

20 Claims, 5 Drawing Sheets

U.S. PATENT DOCUMENTS

| | | |
|---|---|---|
| 5,303,393 A | 4/1994 | Noreen et al. |
| 5,400,261 A | 3/1995 | Reynolds |
| 5,436,653 A | 7/1995 | Ellis et al. |
| 5,437,050 A | 7/1995 | Lamb et al. |
| 5,481,294 A | 1/1996 | Thomas et al. |
| 5,486,686 A | 1/1996 | Zdybel, Jr. et al. |
| 5,504,518 A | 4/1996 | Ellis et al. |
| 5,539,635 A | 7/1996 | Larson, Jr. |
| 5,564,073 A | 10/1996 | Takahisa |
| 5,572,246 A | 11/1996 | Ellis et al. |
| 5,572,653 A | 11/1996 | DeTemple et al. |
| 5,574,519 A | 11/1996 | Manico et al. |
| 5,574,962 A | 11/1996 | Fardeau et al. |
| 5,577,249 A | 11/1996 | Califano |
| 5,577,266 A | 11/1996 | Takahisa et al. |
| 5,579,124 A | 11/1996 | Aijala et al. |
| 5,581,658 A | 12/1996 | O'Hagan et al. |
| 5,581,800 A | 12/1996 | Fardeau et al. |
| 5,584,070 A | 12/1996 | Harris et al. |
| 5,612,729 A | 3/1997 | Ellis et al. |
| 5,621,454 A | 4/1997 | Ellis et al. |
| 5,640,193 A | 6/1997 | Wellner |
| 5,646,997 A | 7/1997 | Barton |
| 5,661,787 A | 8/1997 | Pocock |
| 5,663,766 A | 9/1997 | Sizer, II |
| 5,671,267 A | 9/1997 | August et al. |
| 5,708,478 A | 1/1998 | Tognazzini |
| 5,745,678 A * | 4/1998 | Herzberg et al. ............... 726/32 |
| 5,761,606 A | 6/1998 | Wolzien |
| 5,765,152 A | 6/1998 | Erickson |
| 5,765,176 A | 6/1998 | Bloomberg |
| 5,774,452 A | 6/1998 | Wolosewicz |
| 5,778,192 A | 7/1998 | Schuster et al. |
| 5,781,914 A | 7/1998 | Stork et al. |
| 5,809,317 A | 9/1998 | Kogan |
| 5,832,119 A | 11/1998 | Rhoads |
| 5,841,978 A | 11/1998 | Rhoads |
| 5,860,074 A | 1/1999 | Rowe et al. |
| 5,862,260 A | 1/1999 | Rhoads |
| 5,889,868 A | 3/1999 | Moskowitz et al. |
| 5,892,900 A | 4/1999 | Ginter et al. |
| 5,893,095 A | 4/1999 | Jain et al. |
| 5,901,224 A | 5/1999 | Hecht |
| 5,902,353 A | 5/1999 | Reber et al. |
| 5,903,892 A | 5/1999 | Hoffert et al. |
| 5,905,248 A | 5/1999 | Russell et al. |
| 5,905,800 A | 5/1999 | Moskowitz et al. |
| 5,918,223 A | 6/1999 | Blum et al. |
| 5,926,620 A | 7/1999 | Klein |
| 5,930,369 A | 7/1999 | Cox et al. |
| 5,938,727 A | 8/1999 | Ikeda |
| 5,943,422 A | 8/1999 | Van Wie et al. |
| 5,956,716 A | 9/1999 | Kenner |
| 5,973,731 A | 10/1999 | Schwab |
| 5,982,956 A | 11/1999 | Lahmi |
| 5,983,176 A | 11/1999 | Hoffert et al. |
| 5,986,651 A | 11/1999 | Reber et al. |
| 5,986,692 A | 11/1999 | Logan et al. |
| 5,991,737 A | 11/1999 | Chen |
| 5,995,105 A | 11/1999 | Reber et al. |
| 6,028,960 A | 2/2000 | Graf et al. |
| 6,081,629 A | 6/2000 | Browning |
| 6,081,827 A | 6/2000 | Reber et al. |
| 6,081,830 A | 6/2000 | Schindler |
| 6,084,528 A | 7/2000 | Beach et al. |
| 6,088,455 A | 7/2000 | Logan et al. |
| 6,115,741 A | 9/2000 | Domenikos et al. |
| 6,121,530 A | 9/2000 | Sonoda |
| 6,122,403 A | 9/2000 | Rhoads |
| 6,138,151 A | 10/2000 | Reber et al. |
| 6,157,721 A | 12/2000 | Shear et al. |
| 6,164,534 A | 12/2000 | Rathus et al. |
| 6,169,541 B1 | 1/2001 | Smith |
| 6,199,048 B1 | 3/2001 | Hudetz et al. |
| 6,201,879 B1 | 3/2001 | Bender et al. |
| 6,219,787 B1 | 4/2001 | Brewer |
| 6,229,924 B1 | 5/2001 | Rhoads et al. |
| 6,240,003 B1 | 5/2001 | McElroy |
| 6,282,362 B1 | 8/2001 | Murphy et al. |
| 6,286,036 B1 | 9/2001 | Rhoads |
| 6,307,949 B1 | 10/2001 | Rhoads |
| 6,311,214 B1 | 10/2001 | Rhoads |
| 6,314,457 B1 | 11/2001 | Schena et al. |
| 6,321,992 B1 | 11/2001 | Knowles et al. |
| 6,324,573 B1 | 11/2001 | Rhoads |
| 6,332,031 B1 | 12/2001 | Rhoads et al. |
| 6,345,104 B1 | 2/2002 | Rhoads |
| 6,381,341 B1 | 4/2002 | Rhoads |
| 6,385,329 B1 | 5/2002 | Sharma et al. |
| 6,386,453 B1 | 5/2002 | Russell et al. |
| 6,389,055 B1 | 5/2002 | August et al. |
| 6,401,206 B1 | 6/2002 | Khan et al. |
| 6,408,082 B1 | 6/2002 | Rhoads et al. |
| 6,408,331 B1 | 6/2002 | Rhoads |
| 6,411,725 B1 | 6/2002 | Rhoads |
| 6,421,070 B1 | 7/2002 | Ramos et al. |
| 6,424,725 B1 | 7/2002 | Rhoads et al. |
| 6,425,081 B1 | 7/2002 | Iwamura |
| 6,434,561 B1 | 8/2002 | Durst, Jr. et al. |
| 6,439,465 B1 | 8/2002 | Bloomberg |
| 6,442,285 B2 | 8/2002 | Rhoads et al. |
| 6,496,802 B1 | 12/2002 | Van Zoest et al. |
| 6,505,160 B1 | 1/2003 | Levy et al. |
| 6,512,837 B1 | 1/2003 | Ahmed |
| 6,516,079 B1 | 2/2003 | Rhoads et al. |
| 6,522,769 B1 | 2/2003 | Rhoads et al. |
| 6,522,770 B1 | 2/2003 | Seder et al. |
| 6,526,449 B1 | 2/2003 | Philyaw et al. |
| 6,535,617 B1 | 3/2003 | Hannigan et al. |
| 6,542,927 B2 | 4/2003 | Rhoads |
| 6,542,933 B1 | 4/2003 | Durst, Jr. et al. |
| 6,553,129 B1 | 4/2003 | Rhoads |
| 6,567,533 B1 | 5/2003 | Rhoads |
| 6,574,594 B2 | 6/2003 | Pitman et al. |
| 6,577,746 B1 | 6/2003 | Evans et al. |
| 6,580,808 B2 | 6/2003 | Rhoads |
| 6,590,996 B1 | 7/2003 | Reed et al. |
| 6,611,524 B2 | 8/2003 | Devanagondi et al. |
| 6,611,607 B1 | 8/2003 | Davis et al. |
| 6,614,914 B1 | 9/2003 | Rhoads et al. |
| 6,636,615 B1 | 10/2003 | Rhoads et al. |
| 6,647,128 B1 | 11/2003 | Rhoads |
| 6,647,130 B2 | 11/2003 | Rhoads |
| 6,650,761 B1 | 11/2003 | Rodriguez et al. |
| 6,658,568 B1 | 12/2003 | Ginter et al. |
| 6,674,876 B1 | 1/2004 | Hannigan et al. |
| 6,681,028 B2 | 1/2004 | Rodriguez et al. |
| 6,681,029 B1 | 1/2004 | Rhoads |
| 6,683,966 B1 | 1/2004 | Tian et al. |
| 6,694,041 B1 | 2/2004 | Brunk |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,714,683 B1 | 3/2004 | Tian et al. |
| 6,718,046 B2 | 4/2004 | Reed et al. |
| 6,718,047 B2 | 4/2004 | Rhoads |
| 6,721,440 B2 | 4/2004 | Reed et al. |
| 6,748,360 B2 | 6/2004 | Pitman et al. |
| 6,748,533 B1 | 6/2004 | Wu |
| 6,760,463 B2 | 7/2004 | Rhoads |
| 6,763,123 B2 | 7/2004 | Reed et al. |
| 6,768,809 B2 | 7/2004 | Rhoads et al. |
| 6,768,980 B1 | 7/2004 | Meyer et al. |
| 6,775,392 B1 | 8/2004 | Rhoads |
| 6,785,421 B1 | 8/2004 | Gindele et al. |
| 6,798,894 B2 | 9/2004 | Rhoads |
| 6,804,376 B2 | 10/2004 | Rhoads et al. |
| 6,807,534 B1 | 10/2004 | Erickson |
| 6,813,366 B1 | 11/2004 | Rhoads |
| 6,829,368 B2 | 12/2004 | Meyer et al. |
| 6,834,308 B1 | 12/2004 | Ikezoye |
| 6,850,626 B2 | 2/2005 | Rhoads et al. |
| 6,870,547 B1 | 3/2005 | Crosby et al. |
| 6,879,701 B1 | 4/2005 | Rhoads |
| 6,917,724 B2 | 7/2005 | Seder et al. |

| Patent | Date | Name |
|---|---|---|
| 6,920,232 B2 | 7/2005 | Rhoads |
| 6,931,451 B1 | 8/2005 | Logan et al. |
| 6,941,275 B1 | 9/2005 | Swierczek |
| 6,947,571 B1 | 9/2005 | Rhoads et al. |
| 6,965,682 B1 | 11/2005 | Davis et al. |
| 6,965,683 B2 | 11/2005 | Hein, III |
| 6,973,669 B2 | 12/2005 | Daniels |
| 6,975,746 B2 | 12/2005 | Davis et al. |
| 6,988,202 B1 | 1/2006 | Rhoads et al. |
| 6,996,252 B2 | 2/2006 | Reed et al. |
| 7,003,731 B1 | 2/2006 | Rhoads et al. |
| 7,010,144 B1 | 3/2006 | Davis et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Davis et al. |
| 7,051,086 B2 | 5/2006 | Rhoads et al. |
| 7,054,465 B2 | 5/2006 | Rhoads |
| 7,062,069 B2 | 6/2006 | Rhoads |
| 7,095,871 B2 | 8/2006 | Jones et al. |
| 7,111,170 B2 | 9/2006 | Rhoads et al. |
| 7,113,614 B2 | 9/2006 | Rhoads |
| 7,123,740 B2 | 10/2006 | McKinley |
| 7,139,408 B2 | 11/2006 | Rhoads et al. |
| 7,142,691 B2 | 11/2006 | Levy |
| 7,158,654 B2 | 1/2007 | Rhoads |
| 7,164,780 B2 | 1/2007 | Brundage et al. |
| 7,171,016 B1 | 1/2007 | Rhoads |
| 7,171,018 B2 | 1/2007 | Rhoads et al. |
| 7,174,031 B2 | 2/2007 | Rhoads et al. |
| 7,177,443 B2 | 2/2007 | Rhoads |
| 7,185,201 B2 | 2/2007 | Rhoads et al. |
| 7,213,757 B2 | 5/2007 | Jones et al. |
| 7,224,819 B2 | 5/2007 | Levy et al. |
| 7,243,226 B2 * | 7/2007 | Newcombe et al. .......... 713/155 |
| 7,248,717 B2 | 7/2007 | Rhoads |
| 7,261,612 B1 | 8/2007 | Hannigan et al. |
| 7,289,643 B2 | 10/2007 | Brunk et al. |
| 7,302,574 B2 | 11/2007 | Conwell et al. |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,562 B2 | 2/2008 | Hannigan et al. |
| 7,330,564 B2 | 2/2008 | Brundage et al. |
| 7,333,957 B2 | 2/2008 | Levy et al. |
| 7,349,552 B2 | 3/2008 | Levy et al. |
| 7,369,676 B2 | 5/2008 | Hein, III |
| 7,369,678 B2 | 5/2008 | Rhoads |
| 7,377,421 B2 | 5/2008 | Rhoads |
| 7,391,880 B2 | 6/2008 | Reed et al. |
| 7,406,214 B2 | 7/2008 | Rhoads et al. |
| 7,409,556 B2 * | 8/2008 | Wu et al. ...................... 713/176 |
| 7,424,131 B2 | 9/2008 | Alattar et al. |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,486,799 B2 | 2/2009 | Rhoads |
| 7,502,759 B2 | 3/2009 | Hannigan et al. |
| 7,505,605 B2 | 3/2009 | Rhoads et al. |
| 7,508,955 B2 | 3/2009 | Carr et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,545,951 B2 | 6/2009 | Davis et al. |
| 7,545,952 B2 | 6/2009 | Brundage et al. |
| 7,562,392 B1 | 7/2009 | Rhoads et al. |
| 7,564,992 B2 | 7/2009 | Rhoads |
| 7,565,294 B2 | 7/2009 | Rhoads |
| RE40,919 E | 9/2009 | Rhoads |
| 7,587,602 B2 | 9/2009 | Rhoads |
| 7,590,259 B2 | 9/2009 | Levy et al. |
| 7,593,576 B2 | 9/2009 | Meyer et al. |
| 7,602,978 B2 | 10/2009 | Levy et al. |
| 7,623,823 B2 | 11/2009 | Zito et al. |
| 7,628,320 B2 | 12/2009 | Rhoads |
| 7,643,649 B2 | 1/2010 | Davis et al. |
| 7,650,009 B2 | 1/2010 | Rhoads |
| 7,650,010 B2 | 1/2010 | Levy et al. |
| 7,653,210 B2 | 1/2010 | Rhoads |
| 7,657,058 B2 | 2/2010 | Sharma |
| 7,685,426 B2 | 3/2010 | Ramos et al. |
| 7,689,532 B1 | 3/2010 | Levy |
| 7,693,300 B2 | 4/2010 | Reed et al. |
| 7,693,965 B2 | 4/2010 | Rhoads |
| 7,697,719 B2 | 4/2010 | Rhoads |
| 7,711,143 B2 | 5/2010 | Rhoads |
| 7,711,144 B2 | 5/2010 | Hannigan et al. |
| 7,711,564 B2 | 5/2010 | Levy et al. |
| 7,738,673 B2 | 6/2010 | Reed |
| 7,747,037 B2 | 6/2010 | Hein, III |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,756,892 B2 | 7/2010 | Levy |
| 7,760,905 B2 | 7/2010 | Rhoads et al. |
| 7,762,468 B2 | 7/2010 | Reed et al. |
| 7,787,653 B2 | 8/2010 | Rhoads |
| 7,792,325 B2 | 9/2010 | Rhoads et al. |
| 7,822,225 B2 | 10/2010 | Alattar |
| 7,837,094 B2 | 11/2010 | Rhoads |
| 7,861,312 B2 | 12/2010 | Lee et al. |
| 7,930,546 B2 | 4/2011 | Rhoads et al. |
| 7,945,781 B1 | 5/2011 | Rhoads |
| 7,949,147 B2 | 5/2011 | Rhoads et al. |
| 7,949,149 B2 | 5/2011 | Rhoads et al. |
| 7,953,270 B2 | 5/2011 | Rhoads |
| 7,953,824 B2 | 5/2011 | Rhoads et al. |
| 7,957,553 B2 | 6/2011 | Ellingson et al. |
| 7,961,949 B2 | 6/2011 | Levy et al. |
| 7,965,864 B2 | 6/2011 | Davis et al. |
| 7,966,494 B2 | 6/2011 | Rhoads |
| 7,970,166 B2 | 6/2011 | Carr et al. |
| 7,970,167 B2 | 6/2011 | Rhoads |
| 7,974,436 B2 | 7/2011 | Brunk et al. |
| 7,992,003 B2 | 8/2011 | Rhoads |
| 2001/0011233 A1 | 8/2001 | Narayanaswami |
| 2001/0026618 A1 | 10/2001 | Van Wie et al. |
| 2001/0026629 A1 | 10/2001 | Oki |
| 2001/0031066 A1 | 10/2001 | Meyer et al. |
| 2001/0034705 A1 | 10/2001 | Rhoads et al. |
| 2001/0044744 A1 | 11/2001 | Rhoads |
| 2001/0044824 A1 | 11/2001 | Hunter et al. |
| 2001/0053234 A1 | 12/2001 | Rhoads |
| 2001/0055391 A1 | 12/2001 | Jacobs |
| 2001/0055407 A1 | 12/2001 | Rhoads |
| 2002/0009208 A1 | 1/2002 | Alattar et al. |
| 2002/0021805 A1 | 2/2002 | Schumann et al. |
| 2002/0021822 A1 | 2/2002 | Maeno |
| 2002/0023020 A1 | 2/2002 | Kenyon et al. |
| 2002/0023148 A1 | 2/2002 | Ritz et al. |
| 2002/0023218 A1 | 2/2002 | Lawandy et al. |
| 2002/0028000 A1 | 3/2002 | Conwell et al. |
| 2002/0032698 A1 | 3/2002 | Cox et al. |
| 2002/0033844 A1 | 3/2002 | Levy et al. |
| 2002/0040433 A1 | 4/2002 | Kondo |
| 2002/0052885 A1 | 5/2002 | Levy |
| 2002/0059580 A1 | 5/2002 | Kalker |
| 2002/0069370 A1 | 6/2002 | Mack |
| 2002/0072982 A1 | 6/2002 | Barton et al. |
| 2002/0072989 A1 | 6/2002 | Van de Sluis |
| 2002/0075298 A1 | 6/2002 | Schena et al. |
| 2002/0083123 A1 | 6/2002 | Freedman et al. |
| 2002/0102966 A1 | 8/2002 | Lev et al. |
| 2002/0126872 A1 | 9/2002 | Brunk |
| 2002/0131076 A1 | 9/2002 | Davis |
| 2002/0133499 A1 | 9/2002 | Ward et al. |
| 2002/0146121 A1 * | 10/2002 | Cohen .......................... 380/201 |
| 2002/0150165 A1 | 10/2002 | Huizer |
| 2002/0152388 A1 | 10/2002 | Linnartz et al. |
| 2002/0161741 A1 | 10/2002 | Wang et al. |
| 2002/0176003 A1 | 11/2002 | Seder et al. |
| 2002/0178410 A1 | 11/2002 | Haitsma et al. |

| | | |
|---|---|---|
| 2002/0186886 A1 | 12/2002 | Rhoads |
| 2002/0196272 A1 | 12/2002 | Ramos et al. |
| 2003/0012548 A1 | 1/2003 | Levy et al. |
| 2003/0018709 A1 | 1/2003 | Schrempp et al. |
| 2003/0033321 A1 | 2/2003 | Schrempp et al. |
| 2003/0037010 A1 | 2/2003 | Schmelzer et al. |
| 2003/0040957 A1 | 2/2003 | Rhoads et al. |
| 2003/0105730 A1 | 6/2003 | Davis et al. |
| 2003/0130954 A1 | 7/2003 | Carr et al. |
| 2003/0135623 A1 | 7/2003 | Schrempp et al. |
| 2003/0167173 A1 | 9/2003 | Levy et al. |
| 2003/0174861 A1 | 9/2003 | Levy et al. |
| 2003/0197054 A1 | 10/2003 | Eunson |
| 2004/0005093 A1 | 1/2004 | Rhoads |
| 2004/0145661 A1 | 7/2004 | Murakami et al. |
| 2004/0163106 A1 | 8/2004 | Schrempp et al. |
| 2004/0169892 A1 | 9/2004 | Yoda |
| 2004/0190750 A1 | 9/2004 | Rodriguez et al. |
| 2004/0201676 A1 | 10/2004 | Needham |
| 2004/0223626 A1 | 11/2004 | Honsinger et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0044189 A1 | 2/2005 | Ikezoye et al. |
| 2005/0056700 A1 | 3/2005 | McKinley et al. |
| 2005/0058318 A1 | 3/2005 | Rhoads |
| 2005/0111723 A1 | 5/2005 | Hannigan et al. |
| 2005/0192933 A1 | 9/2005 | Rhoads et al. |
| 2006/0013435 A1 | 1/2006 | Rhoads |
| 2006/0041591 A1 | 2/2006 | Rhoads |
| 2007/0055884 A1 | 3/2007 | Rhoads |
| 2007/0100757 A1 | 5/2007 | Rhoads |
| 2007/0101147 A1 | 5/2007 | Brunk et al. |
| 2007/0108287 A1 | 5/2007 | Davis et al. |
| 2007/0177761 A1 | 8/2007 | Levy |
| 2007/0183623 A1 | 8/2007 | McKinley et al. |
| 2007/0185840 A1 | 8/2007 | Rhoads |
| 2007/0195987 A1 | 8/2007 | Rhoads |
| 2007/0250194 A1 | 10/2007 | Rhoads et al. |
| 2007/0250716 A1 | 10/2007 | Rhoads et al. |
| 2007/0276841 A1 | 11/2007 | Rhoads et al. |
| 2007/0276928 A1 | 11/2007 | Rhoads et al. |
| 2008/0049971 A1 | 2/2008 | Ramos et al. |
| 2008/0052783 A1 | 2/2008 | Levy |
| 2008/0121728 A1 | 5/2008 | Rodriguez |
| 2008/0133416 A1 | 6/2008 | Rhoads |
| 2008/0133555 A1 | 6/2008 | Rhoads et al. |
| 2008/0133556 A1 | 6/2008 | Conwell et al. |
| 2008/0140573 A1 | 6/2008 | Levy et al. |
| 2008/0292134 A1 | 11/2008 | Sharma et al. |
| 2008/0319859 A1 | 12/2008 | Rhoads |
| 2009/0012944 A1 | 1/2009 | Rodriguez et al. |
| 2009/0089525 A1 | 4/2009 | Brunk et al. |
| 2009/0089587 A1 | 4/2009 | Brunk et al. |
| 2009/0125475 A1 | 5/2009 | Rhoads et al. |
| 2009/0138484 A1 | 5/2009 | Ramos et al. |
| 2009/0158318 A1 | 6/2009 | Levy |
| 2009/0177742 A1 | 7/2009 | Rhoads et al. |
| 2009/0286572 A1 | 11/2009 | Rhoads et al. |
| 2010/0008586 A1 | 1/2010 | Meyer et al. |
| 2010/0009722 A1 | 1/2010 | Levy et al. |
| 2010/0036881 A1 | 2/2010 | Rhoads et al. |
| 2010/0045816 A1 | 2/2010 | Rhoads |
| 2010/0046744 A1 | 2/2010 | Rhoads et al. |
| 2010/0062819 A1 | 3/2010 | Hannigan et al. |
| 2010/0138012 A1 | 6/2010 | Rhoads |
| 2010/0172540 A1 | 7/2010 | Davis et al. |
| 2010/0185306 A1 | 7/2010 | Rhoads |
| 2010/0198941 A1 | 8/2010 | Rhoads |
| 2010/0303284 A1 | 12/2010 | Hannigan et al. |
| 2010/0322035 A1 | 12/2010 | Rhoads et al. |
| 2011/0007936 A1 | 1/2011 | Rhoads |
| 2011/0026777 A1 | 2/2011 | Rhoads et al. |
| 2011/0051998 A1 | 3/2011 | Rhoads |
| 2011/0062229 A1 | 3/2011 | Rhoads |
| 2011/0091066 A1 | 4/2011 | Alattar |

FOREIGN PATENT DOCUMENTS

| | | |
|---|---|---|
| EP | 0 493 091 | 7/1992 |
| EP | 0 953 938 | 11/1999 |
| EP | 0 967 803 | 12/1999 |
| EP | 1 173 001 | 1/2002 |
| JP | 11-265396 | 9/1999 |
| WO | WO 98/03923 | 1/1998 |
| WO | WO 99/35809 | 7/1999 |
| WO | WO 00/58940 | 10/2000 |
| WO | WO 01/15021 | 3/2001 |
| WO | WO 01/20483 | 3/2001 |
| WO | WO 01/20609 | 3/2001 |
| WO | WO 01/62004 | 8/2001 |
| WO | WO 01/71517 | 9/2001 |
| WO | WO 01/75629 | 10/2001 |
| WO | WO 02/11123 | 2/2002 |
| WO | WO 02/19589 | 3/2002 |
| WO | WO 02/27600 | 4/2002 |

OTHER PUBLICATIONS

U.S. Appl. No. 09/343,101, filed Jun. 29, 1999, Bruce L. Davis, et al.
U.S. Appl. No. 09/343,104, filed Jun. 29, 1999, Tony F. Rodriguez, et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/491,534, filed Jan. 26, 2000, Bruce L. Davis, et al.
U.S. Appl. No. 09/507,096, filed Feb. 17, 2000, Geoffrey B. Rhoads, et al.
U.S. Appl. No. 09/515,826, filed Feb. 29, 2000, Geoffrey B. Rhoads.
U.S. Appl. No. 09/552,998, filed Apr. 19, 2000, Tony F. Rodriguez, et al.
U.S. Appl. No. 09/567,405, filed May 8, 2000, Geoffrey B. Rhoads, et al.
U.S. Appl. No. 09/574,726, filed May 18, 2000, Geoffrey B. Rhoads.
U.S. Appl. No. 09/629,649, filed Aug. 1, 2000, J. Scott Carr, et al.
U.S. Appl. No. 09/633,587, filed Aug. 7, 2000, Geoffrey B. Rhoads, et al.
U.S. Appl. No. 09/636,102, filed Aug. 10, 2000, Daniel O. Ramos, et al.
U.S. Appl. No. 09/689,289, filed Oct. 11, 2000, Geoffrey B. Rhoads, et al.
U.S. Appl. No. 09/697,015, filed Oct. 25, 2000, Bruce L Davis, et al.
U.S. Appl. No. 09/697,009, filed Oct. 25, 2000, Bruce L. Davis, et al.
U.S. Appl. No. 13/084,981, filed Apr. 12, 2011, Geoffrey B. Rhoads.
Cox et al., "Secure Spread Spectrum Watermarking for Images, Audio and Video," 1996 IEEE, pp. 243-246.
Foote, "An Overview of Audio Information Retrieval," Multimedia Systems, v.7 n. 1, p. 2-10, Jan. 1999.
Ghias et al, Query by Humming: Musical Information Retrieval In An Audio Database. In ACM Multimedia, pp. 231-236, Nov. 1995.
Kageyama et al, Melody Retrieval with Humming, Proceedings of Int. Computer Music Conference (ICMC), 1993.
Lin, et al., "Generating Robust Digital Signature for Image/Video Authentication," Proc. Multimedia and Security workshop at ACM Multimedia'98, Sep. 1, 1998, pp. 49-54.
Muscle Fish press release, Muscle Fish's Audio Search Technology to be Encapsulated into Informix Datablade Module, Jul. 10, 1996.
Wagner, "Fingerprinting," 1983 IEEE, pp. 18-22.
Wold et al, Content-Based Classification, Search, and Retrieval of Audio, IEEE Multimedia Magazine, Fall, 1996.
PCT/US01/50238 Notification of Transmittal of the International Search Report or the Declaration and International Search Report dated May 31, 2002.
PCT/US01/50238 Written Opinion dated Feb. 13, 2003.
U.S. Appl. No. 60/232,618, filed Sep. 14, 2000, Cox.
U.S. Appl. No. 60/257,822, filed Dec. 21, 2000, Aggson et al.
U.S. Appl. No. 60/263,490, filed Jan. 22, 2001, Brunk et al.
May 11, 2011 Notice of Allowance; Dec. 6, 2011 Amendment; and Sep. 13, 2010 Non-final Office Action; all from U.S. Appl. No. 11/613,786.

* cited by examiner

METHODS, APPARATUS AND PROGRAMS FOR GENERATING AND UTILIZING CONTENT SIGNATURES

RELATED APPLICATION DATA

This application is a continuation of U.S. patent application Ser. No. 11/613,876, filed Dec. 20, 2006 (published as US 2007-0101147 A1), which is a continuation of U.S. patent application Ser. No. 10/027,783, filed Dec. 19, 2001 (U.S. Pat. No. 7,289,643). The 10/027,783 application claims the benefit of U.S. Provisional Application Nos. 60/257,822, filed Dec. 21, 2000, and 60/263,490, filed Jan. 22, 2001. Each of these patent documents is hereby incorporated herein by reference.

The subject matter of the present application is related to that disclosed in U.S. Pat. No. 5,862,260, and in the following U.S. patent applications: 09/503,881, filed Feb. 14, 2000 (now U.S. Pat. No. 6,614,914); 09/563,664, filed May 2, 2000 (now U.S. Pat. No. 6,505,160); 09/620,019, filed Jul. 20, 2000; and 09/661,900, filed Sep. 14, 2000 (now U.S. Pat. No. 6,674,879). Each of these patent documents is hereby incorporated herein by reference.

TECHNICAL FIELD

The present invention relates generally to deriving identifying information from data. More particularly, the present invention relates to content signatures derived from data, and to applications utilizing such content signatures.

BACKGROUND AND SUMMARY

Advances in software, computers and networking systems have created many new and useful ways to distribute, utilize and access content items (e.g., audio, visual, and/or video signals). Content items are more accessible than ever before. As a result, however, content owners and users have an increasing need to identify, track, manage, handle, link content or actions to, and/or protect their content items.

These types of needs may be satisfied, as disclosed in this application, by generating a signature of a content item (e.g., a "content signature"). A content signature represents a corresponding content item. Preferably, a content signature is derived (e.g., calculated, determined, identified, created, etc.) as a function of the content item itself. The content signature can be derived through a manipulation (e.g., a transformation, mathematical representation, hash, etc.) of the content data. The resulting content signature may be utilized to identify, track, manage, handle, protect the content, link to additional information and/or associated behavior, and etc. Content signatures are also known as "robust hashes" and "fingerprints," and are used interchangeably throughout this disclosure.

Content signatures can be stored and used for identification of the content item. A content item is identified when a derived signature matches a predetermined content signature. A signature may be stored locally, or may be remotely stored. A content signature may even be utilized to index (or otherwise be linked to data in) a related database. In this manner, a content signature is utilized to access additional data, such as a content ID, licensing or registration information, other metadata, a desired action or behavior, and validating data. Other advantages of a content signature may include identifying attributes associated with the content item, linking to other data, enabling actions or specifying behavior (copy, transfer, share, view, etc.), protecting the data, etc.

A content signature also may be stored or otherwise attached with the content item itself, such as in a header (or footer) or frame headers of the content item. Evidence of content tampering can be identified with an attached signature. Such identification is made through re-deriving a content signature using the same technique as was used to derive the content signature stored in the header. The newly derived signature is compared with the stored signature. If the two signatures fail to match (or otherwise coincide), the content item can be deemed altered or otherwise tampered with. This functionality provides an enhanced security and verification tool.

A content signature may be used in connection with digital watermarking. Digital watermarking is a process for modifying physical or electronic media (e.g., data) to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. And the decoder analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's patent application Ser. No. 09/503,881 (now U.S. Pat. No. 6,614,914) and in U.S. Pat. No. 5,862,260, which are referenced above.

According to one aspect, the digital watermark may be used in conjunction with a content signature. The watermark can provide additional information, such as distributor and receiver information for tracking the content. The watermark data may contain a content signature and can be compared to the content signature at a later time to determine if the content is authentic. As discussed above regarding a frame header, a content signature can be compared to digital watermark data, and if the content signature and digital watermark data match (or otherwise coincide) the content is determined to be authentic. If different, however, the content is considered modified.

According to another aspect, a digital watermark may be used to scale the content before deriving a content signature of the content. Content signatures are sensitive to scaling (e.g., magnification, scaling, rotation, distortion, etc.). A watermark can include a calibration and/or synchronization signal to realign the content to a base state. Or a technique can be used to determine a calibration and/or synchronization based upon the watermark data during the watermark detection process. This calibration signal (or technique) can be used to scale the content so it matches the scale of the content when the content signature was registered in a database or first determined, thus reducing errors in content signature extraction.

DETAILED DESCRIPTION

The following sections describe methods, apparatus, and/or programs for generating, identifying, handling, linking and utilizing content signatures. The terms "content signature," "fingerprint," "hash," and "signature" are used interchangeably and broadly herein. For example, a signature may include a unique identifier (or a fingerprint) or other unique representation that is derived from a content item. Alternatively, there may be a plurality of unique signatures derived from the same content item. A signature may also correspond to a type of content (e.g., a signature identifying related content items). Consider an audio signal. An audio signal may be divided into segments (or sets), and each segment may include a signature. Also, changes in perceptually relevant features between sequential (or alternating) segments may also be used as a signature. A corresponding database may be structured to index a signature (or related data) via transitions of data segments based upon the perceptual features of the content.

As noted above, a content signature is preferably derived as a function of the content item itself. In this case, a signature of a content item is computed based on a specified signature algorithm. The signature may include a number derived from a signal (e.g., a content item) that serves as a statistically unique identifier of that signal. This means that there is a high probability that the signature was derived from the digital signal in question. One possible signature algorithm is a hash (e.g., an algorithm that converts a signal into a lower number of bits). The hash algorithm may be applied to a selected portion of a signal (e.g., the first 10 seconds, a video frame or a image block, etc.) to create a signal. The hash may be applied to discrete samples in this portion, or to attributes that are less sensitive to typical audio processing. Examples of less sensitive attributes include most significant bits of audio samples or a low pass filtered version of the portion. Examples of hashing algorithms include MD5, MD2, SHA, and SHA1.

Figure 1:
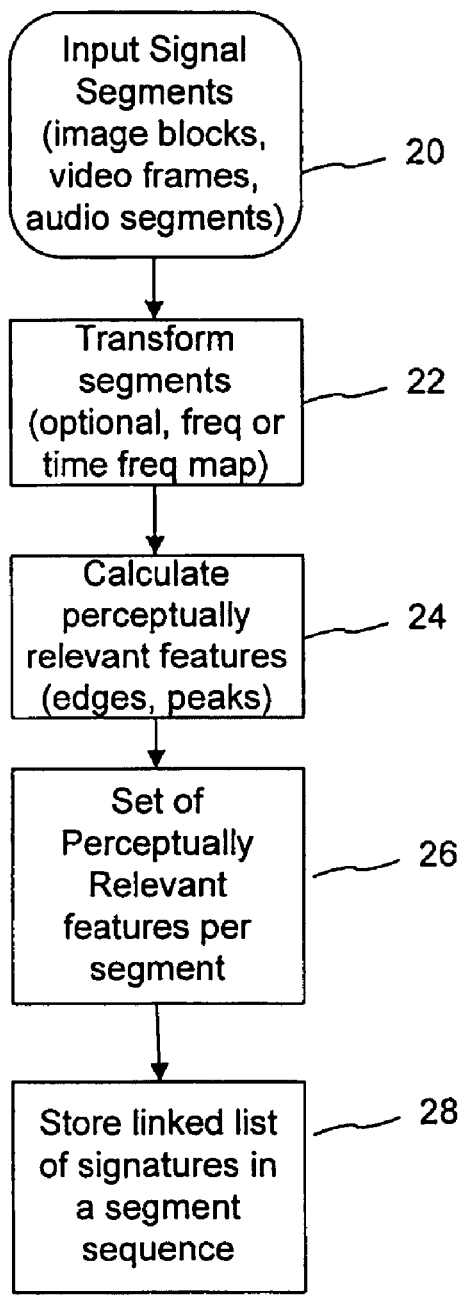
FIG. 1 is a flow diagram of a content signature generating method.

A more dynamic signature deriving process is discussed with respect to FIG. 1. With reference to FIG. 1, an input signal is segmented in step 20. The signal may be an audio, video, or image signal, and may be divided into sets such as segments, frames, or blocks, respectively. Optionally, the sets may be further reduced into respective sub-sets. In step 22, the segmented signal is transformed into a frequency domain (e.g., a Fourier transform domain), or time-frequency domain. Applicable transformation techniques and related frequency-based analysis are discussed in Assignee's 09/661,900 patent application (now U.S. Pat. No. 6,674,876), referenced above. Of course other frequency transformation techniques may be used.

A transformed set's relevant features (e.g., perceptual relevant features represented via edges; magnitude peaks, frequency characteristics, etc.) are identified per set in step 24. For example, a set's perceptual features, such as an object's edges in a frame or a transition of such edges between frames, are identified, analyzed or calculated. In the case of a video signal, perceptual edges may be identified, analyzed, and/or broken into a defining map (e.g., a representation of the edge, the edge location relevant to the segment's orientation, and/or the edge in relation to other perceptual edges.). In another example, frequency characteristics such as magnitude peaks having a predetermined magnitude, or a relatively significant magnitude, are used for such identifying markers. These identifying markers can be used to form the relevant signature.

Edges can also be used to calculate an object's center of mass, and the center of mass may be used as identifying information (e.g., signature components) for an object. For example, after thresholding edges of an object (e.g., identifying the edges), a centering algorithm may be used to locate an object's center of mass. A distance (e.g., up, down, right, left, etc.) may be calculated from the center of mass to each edge, or to a subset of edges, and such dimensions may be used as a signature for the object or for the frame. As an alternative, the largest object (or set of objects) may be selected for such center of mass analysis.

In another embodiment, a generalized Hough transform is used to convert content items such as video and audio signals into a signature. A continuous sequence of the signatures is generated via such a transform. The signature sequence can then be stored for future reference. The identification of the signature is through the transformation of the sequence of signatures. Trellis decoding and Viterbi decoding can be used in the database resolution of the signature.

In step 26, the set's relevant features (e.g., perceptual features, edges, largest magnitude peaks, center of mass, etc.) are grouped or otherwise identified, e.g., thorough a hash, mathematical relationship, orientation, positioning, or mapping to form a representation for the set. This representation is preferably used as a content signature for the set. This content signature may be used as a unique identifier for the set, an identifier for a subset of the content item, or as a signature for the entire content item. Of course, a signature need not be derived for every set (e.g., segment, frame, or block) of a content item. Instead, a signature may be derived for alternating sets or for every nth set, where n is an integer of one or more.

As shown in step 28, resulting signatures are stored. In one example, a set of signatures, which represents a sequence of segments, frames or blocks, is linked (and stored) together. For example, signatures representing sequential or alternating segments in an audio signal may be linked (and stored) together. This linking is advantageous when identifying a content item from a partial stream of signatures, or when the signatures representing the beginning of a content item are unknown or otherwise unavailable (e.g., when only the middle 20 seconds of an audio file are available). When perceptually relevant features are used to determine signatures, a linked list of such signatures may correspond to transitions in the perceptually relevant data between frames (e.g., in video). A hash may also be optionally used to represent such a linked list of signatures.

There are many possible variations for storing a signature or a linked list of signatures. The signature may be stored along with the content item in a file header (or footer) of the segment, or otherwise be associated with the segment. In this case, the signature is preferably recoverable as the file is transferred, stored, transformed, etc. In another embodiment, a segment signature is stored in a segment header (or footer). The segment header may also be mathematically modified (e.g., encrypted with a key, XORed with an ID, etc.) for additional security. The stored content signature can be modified by the content in that segment, or hash of content in that segment, so that it is not recoverable if some or all of content is modified, respectively. The mathematical modification helps to prevent tampering, and to allow recovery of the signature in order to make a signature comparison. Alternatively, the signatures may be stored in a database instead of, or in addition to, being stored with the content item. The database may be local, or may be remotely accessed through a network such as a LAN, WAN, wireless network or internet. When stored in a database, a signature may be linked or associated with additional data. Additional data may include identifying information for the content (e.g., author, title, label, serial numbers, etc.), security information (e.g., copy control), data specifying actions or behavior (e.g., providing a URL, licensing information or rights, etc.), context information, metadata, etc.

To illustrate one example, software executing on a user device (e.g., a computer, PVR, MP3 player, radio, etc.) computes a content signature for a content item (or segments within the content item) that is received or reviewed. The software helps to facilitate communication of the content signature (or signatures) to a database, where it is used to identify the related content item. In response, the database returns related information, or performs an action related to the signature. Such an action may include linking to another computer (e.g., a web site that returns information to the user device), transferring security or licensing information, verifying content and access, etc.

Figure 2:
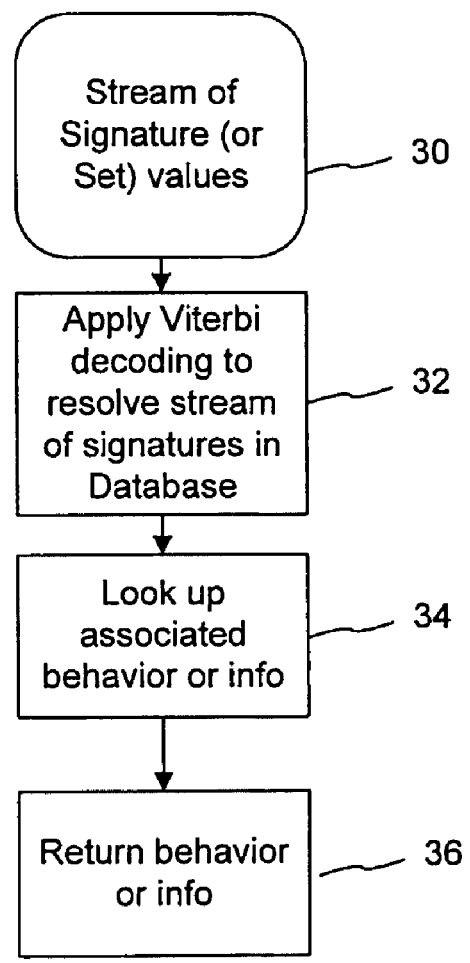
FIG. 2 is a flow diagram of a content signature decoding method.

FIG. 2 is a flow diagram illustrating one possible method to identify a content item from a stream of signatures (e.g., a linked set of consecutive derived signatures for an audio signal). In step 32, Viterbi decoding (as discussed further below) is applied according to the information supplied in the stream of signatures to resolve the identify of the content item. The Viterbi decoding efficiently matches the stream to the corresponding content item. In this regard, the database can be thought of as a trellis structure of linked signatures or signature sequences. A Viterbi decoder can be used to match (e.g., corresponding to a minimum cost function) a stream with a corresponding signature in a database. Upon identifying the content item, the associated behavior or other information is indexed in the database (step 34). Preferably, the associated behavior or information is returned to the source of the signature stream (step 36).

Figure 3:
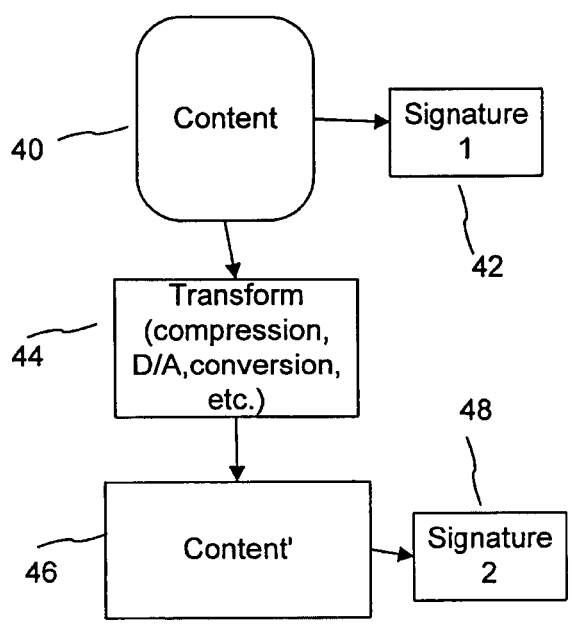
FIG. 3 is a diagram illustrating generation of a plurality of signatures to form a list of signatures.
Figure 4:
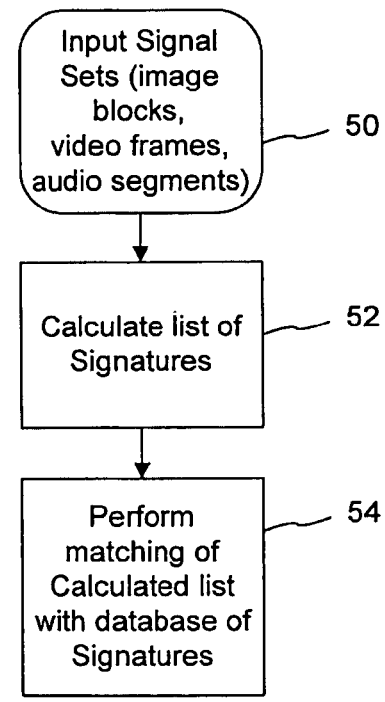
FIG. 4 is a flow diagram illustrating a method to resolve a content ID of an unknown content item.

FIGS. 3 and 4 are diagrams illustrating an embodiment of the present invention in which a plurality of content signatures is utilized to identify a content item. As illustrated in FIG. 3, a content signature 42 is calculated or determined (e.g., derived) from content item 40. The signature 42 may be determined from a hash (e.g., a manipulation which represents the content item 40 as an item having fewer bits), a map of key perceptual features (magnitude peaks in a frequency-based domain, edges, center of mass, etc.), a mathematical representation, etc. The content 40 is manipulated 44, e.g., compressed, transformed, D/A converted, etc., to produce content' 46. A content signature 48 is determined from the manipulated content' 46. Of course, additional signatures may be determined from the content, each corresponding to a respective manipulation. These additional signatures may be determined after one manipulation from the original content 40, or the additional signatures may be determined after sequential manipulations. For example, content' 46 may be further manipulated, and a signature may be determined based on the content resulting from that manipulation. These signatures are then stored in a database. The database may be local, or may be remotely accessed through a network (LAN, WAN, wireless, internet, etc.). The signatures are preferably linked or otherwise associated in the database to facilitate database look-up as discussed below with respect to FIG. 4.

FIG. 4 is a flow diagram illustrating a method to determine an identification of an unknown content item. In step 50, a signal set (e.g., image block, video frame, or audio segment) is input into a system, e.g., a general-purpose computer programmed to determine signatures of content items. A list of signatures is determined in step 52. Preferably, the signatures are determined in a corresponding fashion as discussed above with respect to FIG. 3. For example, if five signatures for a content item, each corresponding to a respective manipulation (or a series of manipulations) of the content item, are determined and stored with respect to a subject content item, then the same five signatures are preferably determined in step 52. The list of signatures is matched to the corresponding signatures stored in the database. As an alternative embodiment, subsets or levels of signatures may be matched (e.g., only 2 of the five signatures are derived and then matched). The security and verification confidence increases as the number of signatures matched increases.

A set of perceptual features of a segment (or a set of segments) can also be used to create "fragile" signatures. The number of perceptual features included in the signature can determine its robustness. If the number is large, a hash could be used as the signature.

Digital Watermarks and Content Signatures

Content signatures may be used advantageously in connection with digital watermarks.

A digital watermark may be used in conjunction with a content signature. The watermark can provide additional information, such as distributor and receiver information for tracking the content. The watermark data may contain a content signature and can be compared to the content signature at a later time to determine if the content is authentic. A content signature also can be compared to digital watermark data, and if the content signature and digital watermark data match (or otherwise coincide) the content is determined to be authentic. If different, however, the content is considered modified.

A digital watermark may be used to scale the content before deriving a content signature of the content. Content signatures are sensitive to scaling (and/or rotation, distortion, etc.). A watermark can include a calibration and/or synchronization signal to realign the content to a base state. Or a technique can be used to determine a calibration and/or synchronization based upon the watermark data during the watermark detection process. This calibration signal (or technique) can be used to scale the content so it matches the scale of the content when the content signature was registered in a database or first determined, thus reducing errors in content signature extraction.

Indeed, a content signature can be used to identify a content item (as discussed above), and a watermark is used to supply additional information (owner ID, metadata, security information, copy control, etc). The following example is provided to further illustrate the interrelationship of content signatures and digital watermarks.

A new version of the Rolling Stones song "Angie" is ripped (e.g., transferred from one format or medium to another). A compliant ripper or a peer-to-peer client operating on a personal computer reads the watermark and calculates the signature of the content (e.g., "Angie"). To ensure that a signature may be rederived after a content item is routinely altered (e.g., rotated, scaled, transformed, etc.), a calibration signal can be used to realign (or retransform) the data before computing the signature. Realigning the content item according to the calibration signal helps to ensure that the content signature will be derived from the original data, and not from an altered original. The calibration signal can be included in header information, hidden in an unused channel or data area, embedded in a digital watermark, etc. The digital watermark and content signature are then sent to a central database. The central database determines from the digital watermark that the owner is, for example, Label X. The content signature is then forwarded to Label X's private database, or to data residing in the central database (depending upon Label X's preference), and this secondary database determines that the song is the new version of "Angie." A compliant ripper or peer-to-peer client embeds the signature (i.e., a content ID) and content owner ID in frame headers in a fashion secure to modification and duplication, and optionally, along with desired ID3v2 tags.

To further protect a signature (e.g., stored in a header or digital watermark), a content owner could define a list of keys, which are used to scramble (or otherwise encrypt) the signature. The set of keys may optionally be based upon a unique ID associated with the owner. In this embodiment, a signature detector preferably knows the key, or gains access to the key through a so-called trusted third party. Preferably, it is optimal to have a signature key based upon content owner ID. Such a keying system simplifies database look-up and organization. Consider an example centered on audio files. Various record labels may wish to keep the meaning of a content ID private. Accordingly, if a signature is keyed with an owner ID, the central database only needs to identify the record label's content owner ID (e.g., an ID for BMG) and then it can forward all BMG songs to a BMG database for their response. In this case, the central database does not need all of the BMG content to forward audio files (or ID's) to BMG, and does not need to know the meaning of the content ID. Instead, the signature representing the owner is used to filter the request.

Content Signature Calculations

For images or video, a content signature can be based on a center of mass of an object or frame, as discussed above. An alternative method is to calculate an object's (or frame's) center of mass is to multiply each pixel's luminescence with its location from the lower left corner (or other predetermined position) of the frame, sum all pixels within the object or frame, and then divide by the average luminescence of the object or frame. The luminescence can be replaced by colors, and a center of mass can be calculated for every color, such as RGB or CMYK, or one color. The center of mass can be calculated after performing edge detection, such as high pass filtering. The frame can be made binary by comparing to a threshold, where a 1 represents a pixel greater than the threshold and a 0 represents a pixel less than the threshold. The threshold can be arbitrary or calculated from an average value of the frame color, luminescence, either before or after edge detection. The center of mass can produce a set of values by being calculated for segments of the frame, in images or video, or for frames over time in video.

Similarly, the average luminescence of a row or block of a frame can be used as the basic building block for a content signature. The average value of each row or block is put together to represent the signature. With video, there could be the calculation of rows and blocks over time added to the set of values representing the signature.

The center of mass can be used for object, when the objects are predefined, such as with MPEG. The center of mass for each object is sequentially combined into a content signature.

One way of identifying audio and video content—apart from digital watermarks—is fingerprinting technology. As discussed herein, such fingerprinting technology generally works by characterizing content by some process that usually—although not necessarily—yields a unique data string. Innumerable ways can be employed to generate the data string. What is important is (a) its relative uniqueness, and (2) its relatively small size. Thus a 1 Mbyte audio file may be distilled down to a 2 Kbyte identifier.

One technique of generating a fingerprint—seemingly not known in the art—is to select frames (video or MP3 segments, etc.) pseudorandomly, based on a known key, and then performing a hashing or other lossy transformation process on the frames thus selected.

Content Signature Applications

One longstanding application of such technology has been in monitoring play-out of radio advertising. Advertisements are "fingerprinted," and the results stored in a database. Monitoring stations then process radio broadcasts looking for audio that has one of the fingerprints stored in the database. Upon finding a match, play-out of a given advertisement is confirmed.

Some fingerprinting technology may employ a "hash" function to yield the fingerprint. Others may take, e.g., the most significant bit of every $10^{th}$ sample value to generate a fingerprint. Etc., etc. A problem arises, however, if the content is distorted. In such case, the corresponding fingerprint may be distorted too, wrongly failing to indicate a match.

In accordance with this aspect of the present invention, content is encoded with a steganographic reference signal by which such distortion can be identified and quantized. If the reference data in a radio broadcast indicates that the audio is temporally scaled (e.g., by tape stretch, or by psycho-acoustic broadcast compression technology), the amount of scaling can be determined. The resulting information can be used to compensate the audio before fingerprint analysis is performed. That is, the sensed distortion can be backed-out before the fingerprint is computed. Or the fingerprint analysis process can take the known temporal scaling into account when deriving the corresponding fingerprint. Likewise with distorted image and video. By such approaches, fingerprint technology is made a more useful technique.

(application Ser. No. 09/452,023, filed Nov. 30, 1999 (now U.S. Pat. No. 6,408,082), details such a reference signal (sometimes termed a "grid" signal, and its use in identifying and quantizing distortion. application Ser. No. 09/689,250 (now U.S. Pat. No. 6,512,837) details various fingerprint techniques.)

In a variant system, a watermark payload—in addition to the steganographic reference signal—is encoded with the content. Thus, the hash (or other fingerprint) provides one identifier associated with the content, and the watermark provides another. Either can be used, e.g., to index related information (such as connected content). Or they can be used jointly, with the watermark payload effectively extending the ID conveyed by the hash (or vice versa).

In addition, the grid signal discussed above may consist of tiles, and these tiles can be used to calibrate content signatures that consist of a set of sub-fingerprints. For example, the tile of the grid can represent the border or block for each of the calculations of the sub-fingerprints, which are then combined into a content signature.

A technique similar to that detailed above can be used in aiding pattern recognition. Consider services that seek to identify image contents, e.g., internet porn filtering, finding a particular object depicted among thousands of frames of a motion picture, or watching for corporate trademarks in video media. (Cobion, of Kassel, Germany, offers some such services.) Pattern recognition can be greatly for-shortened if the orientation, scale, etc., of the image are known. Consider the Nike swoosh trademark. It is usually depicted in horizontal orientation. However, if an image incorporating the swoosh is rotated 30 degrees, its recognition is made more complex.

To redress this situation, the original image can be steganographically encoded with a grid (calibration) signal as detailed in the 09/452,023 (now U.S. Pat. No. 6,408,082) application. Prior to performing any pattern recognition on the image, the grid signal is located, and indicates that the image has been rotated 30 degrees. The image can then be counter-rotated before pattern recognition is attempted.

Fingerprint technology can be used in conjunction with digital watermark technology in a variety of additional ways. Consider the following.

One is to steganographically convey a digital object's fingerprint as part of a watermark payload. If the watermark-encoded fingerprint does not match the object's current fingerprint, it indicates the object has been altered.

A watermark can also be used to trigger extraction of an object's fingerprint (and associated action based on the fingerprint data). Thus, one bit of a watermark payload, may signal to a compliant device that it should undertake a fingerprint analysis of the object.

In other arrangements, the fingerprint detection is performed routinely, rather than triggered by a watermark. In such case, the watermark can specify an action that a compliant device should perform using the fingerprint data. (In cases where a watermark triggers extraction of the fingerprint, a further portion of the watermark can specify a further action.) For example, if the watermark bit has a "0" value, the device may respond by sending the fingerprint to a remote database; if the watermark bit has a "1" value, the fingerprint is stored locally.

Still further, frail (or so-called fragile) watermarks can be used in conjunction with fingerprint technology. A frail or fragile watermark is designed to be destroyed, or to degrade predictably, upon some form of signal processing. In the current fingerprinting environment, if a frail watermark is detected, then a fingerprint analysis is performed; else not. And/or, the results of a fingerprint analysis can be utilized in accordance with information conveyed by a frail watermark. (Frail watermarks are disclosed, e.g., in application Ser. Nos. 09/234,780, 09/433,104 (now U.S. Pat. No. 6,636,615), 60/198,138, 09/616,462 (now U.S. Pat. No. 6,332,031), 09/645,779 (now U.S. Pat. No. 6,714,683), 60/232,163, 09/689,293 (now U.S. Pat. No. 6,683,966), and 09/689,226 (now U.S. Pat. No. 6,694,041).)

Content Signatures from Compressed Data

Content signatures can be readily employed with compressed or uncompressed data content. One inventive method determines the first n significant bits (where n is an integer, e.g., 64) of a compression signal and uses the n bits as (or to derive) a signature for that signal. This signature technique is particularly advantageous since, generally, image compression schemes code data by coding the most perceptually relevant features first, and then coding relevantly less significant features from there. Consider JPEG 2000 as an example. As will be appreciated by those skilled in that art, JPEG 2000 uses a wavelet type compression, where the image is hierarchically sub-divided into sub-bands, from low frequency perceptually relevant features, to higher frequency lesser perceptually relevant features. Using the low frequency information as a signature (or a signature including a hash of this information) creates a perceptually relevant signature.

The largest frequency components from a content item (e.g., a video signal) can use the compressed or uncompressed data to determine a signature. For example, in an MPEG compressed domain, large scaling factors (e.g., 3 or more of the largest magnitude peaks) are identified, and these factors are used as a content signature or to derive (e.g., a mapping or hash of the features) a content signature. As an optional feature, a content item is low pass filtered to smooth rough peaks in the frequency domain. As a result, the large signature peaks are not close neighbors.

Continuing this idea with time varying data, transitions in perceptually relevant data of frames of audio/video over time can be tracked to form a unique content signature. For example, in compressed video, a perceptually relevant hash of n frames can be used to form a signature of the content. In audio, the frames correspond to time segments, and the perceptually relevant data could be defined similarly, based on human auditory models, e.g., taking the largest frequency coefficients in a range of frequencies that are the most perceptually significant. Accordingly, the above inventive content signature techniques are applicable to compressed data, as well as uncompressed data.

Cue Signals and Content Signatures

Cue signals are an event in the content, which can signal the beginning of a content signature calculation. For example, a fade to black in video could be a cue to start calculating (e.g., deriving) the content signature, either for original entry into the database or for database lookup.

If the cue signal involves processing, where the processing is part of the content signature calculation, the system will be more efficient. For example, if the content signature is based upon frequency peaks, the cue signal could be a specific pattern in the frequency components. As such, when the cue signal is found, the content signature is partially calculated, especially if the content signature is calculated with content before the cue (which should be saved in memory while searching for the cue signal). Other cue signals may include, e.g., I-frames, synchronization signals, and digital watermarks.

In the broadcast monitoring application, where the presence and amount of content is measured, such as an advertisement on TV, timing accuracy (e.g., with a 1 sec.) is required. However, cue signals do not typically occur on such a regular interval (e.g., 1 sec.). As such, content signatures related to a cue signal can be used to identify the content, but the computation of the content to locate the cue signal elements are saved to determine timing within the identified content. For example, the cue signal may include the contrast of the center of the frame, and the contrast from frame to frame represents the timing of the waveform and is saved. The video is identified from several contrast blocks, after a specific cue, such as fade to black in the center. The timing is verified by comparing the pre-existing and future contrasts of the center frame to those stored in the database for the TV advertisement.

Content signatures are synchronized between extraction for entry into the database and for extraction for identifying the unknown content by using peaks of the waveform envelope. Even when there is an error calculating the envelope peak, if the same error occurs at both times of extraction, the content signatures match since they are both different by the same amount; thus, the correct content is identified.

List Decoding and Trellis Coded Quantization

The following discussion details another method, which uses Trellis Coded Quantization (TCQ), to derive a content signature from a content item. Whereas the following discussion uses an image for an example, it will be appreciated by one of ordinary skill in the art that the concepts detailed below can be readily applied to other content items, such as audio, video, etc. For this example, an image is segmented into blocks, and real numbers are associated with the blocks. In a more general application of this example, a set of real numbers is provided and a signature is derived from the set of real numbers.

Initial Signature Calculation

Figure 5:
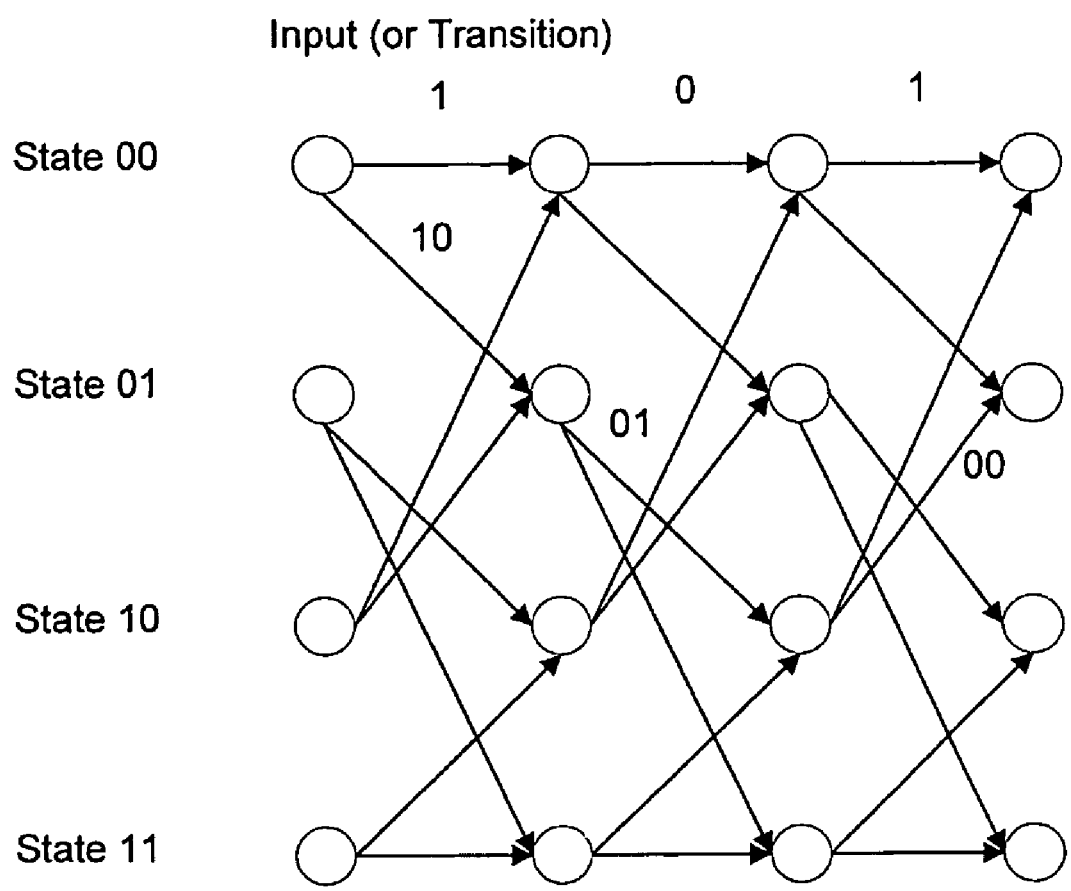
FIG. 5 illustrates an example of a trellis diagram.
Figure 6:
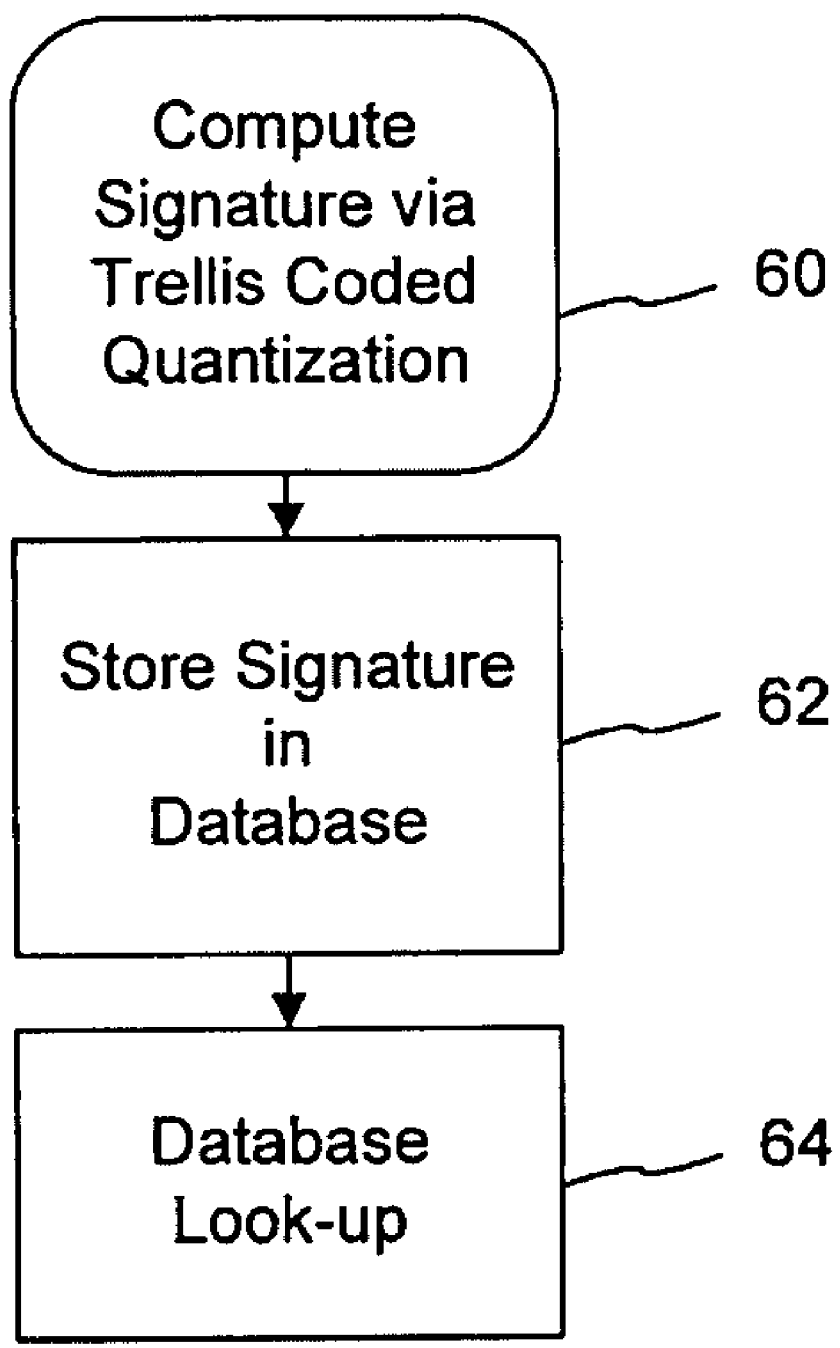
FIG. 6 is a flow diagram illustrating a method of applying Trellis Coded Quantization to generate a signature.
Figure 7:
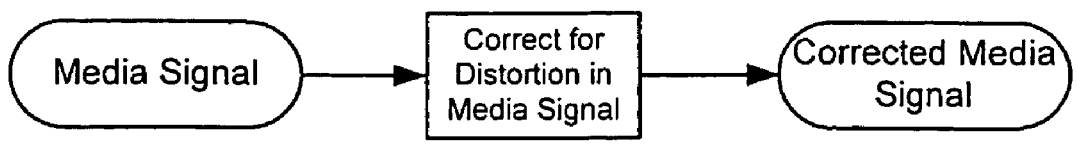
FIG. 7 is a diagram illustrating correcting distortion in a media signal (e.g., the media signal representing an image, audio or video).
Figure 8:
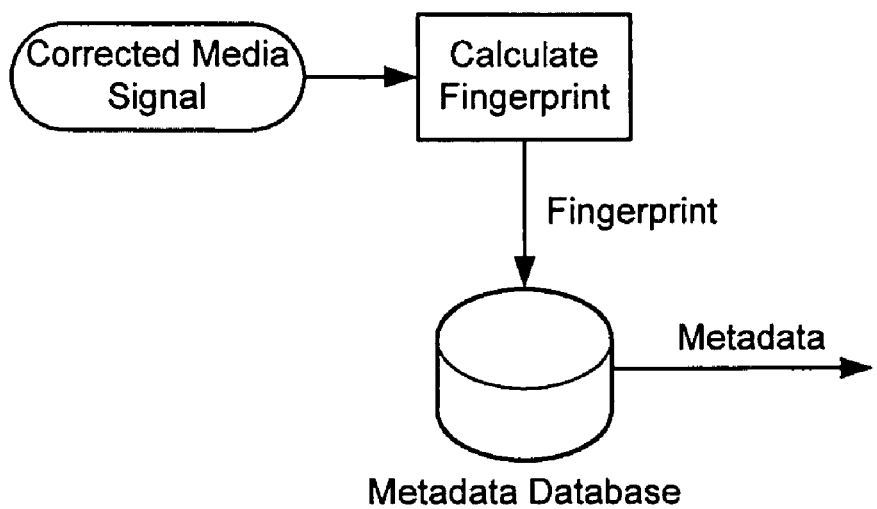
FIG. 8 is a diagram illustrating the use of a fingerprint, derived from a corrected media signal, to obtain metadata associated with the media signal.

In step 60 of FIG. 6, TCQ is employed to compute an N-bit hash of N real numbers, where N is an integer. The N real numbers may correspond to (or represent) an image, or may otherwise correspond to a data set. This method computes the hash using a Viterbi algorithm to calculate the shortest path through a trellis diagram associated with the N real numbers. A trellis diagram, a generalized example of which is shown in FIG. 5, is used to map transition states (or a relationship) for related data. In this example, the relationship is for the real numbers. As will be appreciated by those of ordinary skill in the art, the Viterbi algorithm finds the best state sequence (with a minimum cost) through the trellis. The resulting shortest path is used as the signature. Further reference to Viterbi Decoding Algorithms and trellis diagrams may be had to "List Viterbi Decoding Algorithms with Applications," IEEE Transactions on Communications, Vol. 42, No. 2/3/4, 1994, pages 313-322, hereby incorporated by reference.

One way to generate the N real numbers is to perform a wavelet decomposition of the image and to use the resulting coefficients of the lowest frequency sub-band. These coefficients are then used as the N real numbers for the Viterbi decoding (e.g., to generate a signature or hash).

One way to map a larger set of numbers M to an N bit hash, where M>N and M and N are integers, is to use trellis coded vector quantization, where the algorithm deals with sets of real numbers, rather than individual real numbers. The size and complexity for a resulting signature may be significantly reduced with such an arrangement.

In step 62 (FIG. 6), the initial signature (e.g., hash) is stored in a database. Preferably, the signature is associated with a content ID, which is associated with a desired behavior, information, or action. In this manner, a signature may be used to index or locate additional information or desired behavior.

Recalculating Signatures for Matching in the Database

In a general scenario, a content signature (e.g., hash) is recalculated from the content item as discussed above with respect to Trellis Coded Quantization.

In many cases, however, a content signal will acquire noise or other distortion as it is transferred, manipulated, stored, etc. To recalculate the distorted content signal's signature (e.g., calculate a signature to be used as a comparison with a previously calculated signature), the following steps may be taken. Generally, list decoding is utilized as a method to identify the correct signature (e.g., the undistorted signature). As will be appreciated by one of ordinary skill in the art, list decoding is a generalized form of Viterbi decoding, and in this application is used to find the most likely signatures for a distorted content item. List decoding generates X the most likely signatures for the content item, where X is an integer. To do so, a list decoding method finds the X shortest paths (e.g., signatures) through a related trellis diagram. The resulting X shortest paths are then used as potential signature candidates to find the original signature.

As an alternative embodiment, and before originally computing the signature (e.g., for storage in the database), a calibration watermark is embedded in the content item, and possibly with one or more bits of auxiliary data. A signature is then calculated which represents the content with the watermark signal. The calibration watermark assists in re-aligning the content after possible distortion when recomputing a signature from a distorted signal. The auxiliary data can also be used as an initial index into the database to reduce the complexity of the search for a matching a signature. Database lookup time is reduced with the use of auxiliary data.

In the event that a calibration watermark is included in the content, the signature is recomputed after re-aligning the content data with calibration watermark. Accordingly, a signature of the undistorted, original (including watermark) content can be derived.

Database Look-Up

Once a content signature (e.g., hash) is recalculated in one of the methods discussed above, a database query is executed to match recalculated signatures against stored signatures, as shown in step 64 (FIG. 6). This procedure, for example, may proceed according to known database querying methods.

In the event that list decoding generates X most likely signatures, the X signatures are used to query the database until a match is found. Auxiliary data, such as provided in a watermark, can be used to further refine the search. A user may be presented with all possible matches in the event that two or more of the X signatures match signatures in the database.

A progressive signature may also be used to improve database efficiency. For example, a progressive signature may include a truncated or smaller hash, which represents a smaller data set or only a few (out of many) segments, blocks or frames. The progressive hash may be used to find a plurality of potential matches in the database. A more complete hash can then be used to narrow the field from the plurality of potential matches. As a variation of this progressive signature matching technique, soft matches (e.g., not exact, but close matches) are used at one or more points along the search. Accordingly, database efficiency is increased.

Database lookup for content signatures can use a database configuration based upon randomly addressable memory (RAM). In this configuration, the database can be pre-organized by neighborhoods of related content signatures to speed detection. In addition, the database can be searched in conventional methods, such as binary tree methods.

Given that the fingerprint is of fixed size, it represents a fixed number space. For example, a 32-bit fingerprint has 4 billion potential values. In addition, the data entered in the database can be formatted to be a fixed size. Thus, any database entry can be found by multiplying the fingerprint by the size of the database entry size, thus speeding access to the database.

Content Addressable Memory

Another inventive alternative uses a database based on content addressable memory (CAM) as opposed to RAM. CAM devices can be used in network equipment, particularly routers and switches, computer systems and other devices that require content searching.

Operation of a CAM device is unlike that of a RAM device. For RAM, a controller provides an address, and the address is used to access a particular memory location within the RAM memory array. The content stored in the addressed memory location is then retrieved from the memory array. A CAM device, on the other hand, is interrogated by desired content.

Indeed, in a CAM device, key data corresponding to the desired content is generated and used to search the memory locations of the entire CAM memory array. When the content stored in the CAM memory array does not match the key data, the CAM device returns a "no match" indication. When the content stored in the CAM memory array matches the key data, the CAM device outputs information associated with the content. Further reference to CAM technology can be made to U.S. Pat. Nos. 5,926,620 and 6,240,003, which are each incorporated herein by reference.

CAM is also capable of performing parallel comparisons between input content of a known size and a content table completely stored in memory, and when it finds a match it provides the desired associated output. CAM is currently used, e.g., for Internet routing. For example, an IP address of 32 bits can be compared in parallel with all entries in a corresponding 4-gigabit table, and from the matching location the output port is identified or linked to directly. CAM is also used in neural networks due to the similarity in structure. Interestingly, it is similar to the way our brain functions, where neurons perform processing and retain the memory—as opposed to Van Neumann computer architecture, which has a CPU, and separate memory that feeds data to the CPU for processing.

CAM can also be used in identifying fingerprints with metadata.

For file based fingerprinting, where one fingerprint uniquely identifies the content, the resulting content fingerprint is of a known size. CAM can be used to search a complete fingerprint space as is done with routing. When a match is found, the system can provide a web link or address for additional information/metadata. Traditionally CAM links to a port, but it can also link to memory with a database entry, such as a web address.

CAM is also useful for a stream-based fingerprint, which includes a group of sub-fingerprints. CAM can be used to look up the group of sub-fingerprints as one content signature as described above.

Alternatively, each sub-fingerprint can be analyzed with CAM, and after looking up several sub-fingerprints one piece of content will be identified, thus providing the content signature. From that content signature, the correct action or web link can quickly be found with CAM or traditional RAM based databases.

More specifically, the CAM can include the set of sub-fingerprints with the associated data being the files that include those sub-fingerprints. After a match is made in CAM with an input sub-fingerprint, the complete set of sub-fingerprints for each potential file can be compared to the set of input fingerprints using traditional processing methods based upon hamming errors. If a match is made, the file is identified. If not, the next sub-fingerprint is used in the above process since the first sub-fingerprint must have had an error. Once the correct file is identified, the correct action or web link can quickly be found with CAM or traditional RAM-based databases, using the unique content identification, possibly a number or content name.

Varying Content

Some content items may be represented as a sequence of N bit signatures, such as time varying audio and video content. A respective N bit signature may correspond to a particular audio segment, or video frame, such as an I frame. A database may be structured to accommodate such a structure or sequence.

In one embodiment, a calibration signal or some other frame of reference (e.g., timing, I frames, watermark counter, auxiliary data, header information, etc.) may be used to synchronize the start of the sequence and reduce the complexity of the database. For example, an audio signal may be divided into segments, and a signature (or a plurality of signatures) may be produced for such segments. The corresponding signatures in the database may be stored or aligned according to time segments, or may be stored as a linked list of signatures.

As an alternative, a convolution operation is used to match an un-synchronized sequence of hashes with the sequences of hashes in the database, such as when a synchronization signal is not available or does not work completely. In particular, database efficiency may be improved by a convolution operation such as a Fast Fourier Transform (FFT), where the convolution essentially becomes a multiplication operation. For example, a 1-bit hash may be taken for each segment in a sequence. Then to correlate the signatures, an inverse FFT is taken of the 1-bit hashes. The magnitude peaks associated with the signatures (and transform) are analyzed. Stored signatures are then searched for potential matches. The field is further narrowed by taking progressively larger signatures (e.g., 4-bit hashes, 8-bit hashes, etc.).

As a further alternative, a convolution plus a progress hash is employed to improve efficiency. For example, a first sequence of 1-bit hashes is compared against stored signatures. The matches are grouped as a potential match sub-set. Then a sequence of 2-bit hashes is taken and compared against the second sub-set—further narrowing the potential match field. The process repeats until a match is found.

Dual Fingerprint Approach

An efficiently calculated content signature can be used to narrow the search to a group of content. Then, a more accurate and computationally intense content signature can be calculated on minimal content to locate the correct content from the group. This second more complex content signature extraction can be different than the first simple extraction, or it can be based upon further processing of the content used in the first, but simple, content signature. For example, the first content signature may include peaks of the envelope, and the second content signature comprises the relative amplitude of each Fourier component as compared to the previous component, where a 1 is created when the current component is greater than the previous and a 0 is created when the current component is less than or equal to the previous component As another example, the first content signature may include the three largest Fourier peaks, and the second content signature may include the relative amplitude of each Fourier component, as described in the previous example.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

It should be appreciated that the above section headings are not intended to limit the present invention, and are merely provided for the reader's convenience. Of course, subject matter disclosed under one section heading can be readily combined with subject matter under other headings.

The methods, processes, and systems described above may be implemented in hardware, software or a combination of hardware and software. For example, the transformation and signature deriving processes may be implemented in a programmable computer running executable software or a special purpose digital circuit. Similarly, the signature deriving and matching process and/or database functionality may be implemented in software, electronic circuits, firmware, hardware, or combinations of software, firmware and hardware. The methods and processes described above may be implemented in programs executed from a system's memory (a computer readable medium, such as an electronic, optical, magnetic-optical, or magnetic storage device).

The particular combinations of elements and features in the above-detailed embodiments are exemplary only; the interchanging and substitution of these teachings with other teachings in this and the incorporated-by-reference patents/applications are also contemplated.

What is claimed is:

1. A method comprising:
obtaining a content item comprising a plurality of frames or segments;
obtaining a key;
seeding a pseudo-random generator with the key;
selecting a set of the plurality of frames or segments using the seeded pseudo-random generator; and
deriving, using a processor, a content signature for the content item from data within the set of the plurality of frames or segments, wherein the content signature comprises a reduced-bit representation of the set of the plurality of frames or segments.

2. The method of claim 1, wherein the content signature comprises a unique identifier of the content item.

3. The method of claim 1, wherein the content item comprises video.

4. The method of claim 3, wherein the video comprises compressed video.

5. The method of claim 1, wherein the content item comprise audio.

6. The method of claim 5, wherein the audio comprises compressed audio.

7. The method of claim 1, wherein the key comprises a unique identifier.

8. The method of claim 1, wherein deriving the content signature comprises evaluating perceptually relevant features, a frequency domain analysis, hashing or a lossy transformation of the set of the plurality of frames or segments.

9. An apparatus comprising:
a processor configured to:
obtain a content item comprising a plurality of frames or segments;
obtain a key;
seed a pseudo-random generator with the key to;
select a set of the plurality of frames or segments using the seeded pseudo-random generator; and
derive a content signature for the content item from data within the set of the plurality of frames or segments, wherein the content signature comprises a reduced-bit representation of at least the set of the plurality of frames or segments.

10. The apparatus of claim 9, wherein the content signature comprises a unique identifier of the content item.

11. The method of claim 9, wherein the content item represents video.

12. The method of claim 9, wherein the content item represents audio.

13. The apparatus of claim 9, wherein the key comprises a unique identifier.

14. The apparatus of claim 9, wherein the processor is configured to derive the content signature by evaluating perceptually relevant features, a frequency domain analysis, hashing or a lossy transformation of the set of the plurality of frames or segments.

15. A tangible computer-readable medium having instructions stored thereon, the instructions comprising:
instructions to obtain a content item comprising a plurality of frames or segments;
instructions to obtain a key;
instructions to seed a pseudo-random generator with the key to;
instructions to select a set of the plurality of frames or segments using the seeded pseudo-random generator; and
instructions to derive a content signature for the content item from data within the set of the plurality of frames or segments, wherein the content signature comprises a reduced-bit representation of at least the set of the plurality of frames or segments.

16. The tangible computer-readable medium of claim 15, wherein the content signature comprises a unique identifier of the content item.

17. The tangible computer-readable medium of claim 15, wherein the content item represents video.

18. The tangible computer-readable medium of claim 15, wherein the content item represents audio.

19. The tangible computer-readable medium of claim 15, wherein the key comprises a unique identifier.

20. The tangible computer-readable medium of claim 15, wherein deriving the content signature comprises evaluating perceptually relevant features, a frequency domain analysis, hashing or a lossy transformation of the set of the plurality of frames or segments.

* * * * *

UNITED STATES PATENT AND TRADEMARK OFFICE
CERTIFICATE OF CORRECTION

PATENT NO.           : 8,077,911 B2                                        Page 1 of 1
APPLICATION NO.      : 12/331227
DATED                : December 13, 2011
INVENTOR(S)          : Brunk et al.

It is certified that error appears in the above-identified patent and that said Letters Patent is hereby corrected as shown below:

On Title Page 2, in item (56), under "U.S. PATENT DOCUMENTS", in Column 1, Line 53, delete "Kenner" and insert -- Kenner et al. --, therefor.

In Column 5, Line 47, delete "identify" and insert -- identity --, therefor.

In Column 8, Line 52, delete "(application" and insert -- Application --, therefor.

In Column 8, Line 55, delete "application" and insert -- Application --, therefor.

In Column 8, Line 57, delete "techniques.)" and insert -- techniques. --, therefor.

Signed and Sealed this
Twenty-eighth Day of August, 2012

David J. Kappos
*Director of the United States Patent and Trademark Office*